United States Patent
Rakshit et al.

(10) Patent No.: US 10,679,644 B2
(45) Date of Patent: *Jun. 9, 2020

(54) PRODUCTION OF SPEECH BASED ON WHISPERED SPEECH AND SILENT SPEECH

(71) Applicant: International Business Machines Corporation, Armonk, NY (US)

(72) Inventors: Sarbajit K. Rakshit, Kolkata (IN); Martin G. Keen, Cary, NC (US); James E. Bostick, Cedar Park, TX (US); John M. Ganci, Jr., Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/541,692

(22) Filed: Aug. 15, 2019

(65) Prior Publication Data

US 2019/0371356 A1    Dec. 5, 2019

Related U.S. Application Data

(63) Continuation of application No. 15/846,850, filed on Dec. 19, 2017, now Pat. No. 10,529,355.

(51) Int. Cl.
  *G10L 21/10*    (2013.01)
  *G06F 17/28*    (2006.01)
  (Continued)

(52) U.S. Cl.
  CPC .............. *G10L 21/10* (2013.01); *G06F 40/58* (2020.01); *G10L 13/043* (2013.01); *G10L 15/22* (2013.01);
  (Continued)

(58) Field of Classification Search
  CPC ....... G10L 21/10; G10L 13/043; G10L 15/22; G10L 15/25; G06F 17/289
  See application file for complete search history.

(56) References Cited

U.S. PATENT DOCUMENTS 6,006,175 A    12/1999    Holzrichter
7,486,798 B2    2/2009    Anjanappa et al.
(Continued)

OTHER PUBLICATIONS

Dysarthric Speech Recognition Using Dysarthria-Severity-Dependent and Speaker-Adaptive Models (Year: 2013).*
(Continued)

*Primary Examiner* — Mohammad K Islam
(74) *Attorney, Agent, or Firm* — Will Stock; Edell, Shapiro & Finnan, LLC

(57) ABSTRACT

A method, a system, and a computer program product are provided for interpreting low amplitude speech and transmitting amplified speech to a remote communication device. At least one computing device receives sensor data from multiple sensors. The sensor data is associated with the low amplitude speech. At least one of the at least one computing device analyzes the sensor data to map the sensor data to at least one syllable resulting in a string of one or more words. An electronic representation of the string of the one or more words may be generated and transmitted to a remote communication device for producing the amplified speech from the electronic representation.

16 Claims, 10 Drawing Sheets

(51) Int. Cl.
| | |
|---|---|
| *G10L 15/22* | (2006.01) |
| *G10L 15/25* | (2013.01) |
| *G10L 13/04* | (2013.01) |
| *G10L 19/00* | (2013.01) |
| *G10L 21/0364* | (2013.01) |
| *G10L 21/003* | (2013.01) |
| *G10L 15/02* | (2006.01) |
| *G10L 13/00* | (2006.01) |
| *G10L 15/26* | (2006.01) |
| *G06F 40/58* | (2020.01) |

(52) U.S. Cl.
CPC .......... *G10L 15/25* (2013.01); *G10L 19/0018* (2013.01); *G10L 21/0364* (2013.01); *G10L 13/00* (2013.01); *G10L 15/26* (2013.01); *G10L 21/003* (2013.01); *G10L 2015/027* (2013.01); *G10L 2021/105* (2013.01)

(56) References Cited

U.S. PATENT DOCUMENTS

| | | | |
|---|---|---|---|
| 8,552,861 | B2 | 10/2013 | Bastide et al. |
| 9,129,595 | B2 | 9/2015 | Russel et al. |
| 9,424,842 | B2* | 8/2016 | Liu .................... G10L 15/24 |
| 2005/0278167 | A1* | 12/2005 | Burnett ............... A61B 5/0507 704/207 |
| 2011/0319021 | A1* | 12/2011 | Proulx .................. H04R 17/02 455/41.2 |
| 2012/0029912 | A1 | 2/2012 | Almagro |
| 2014/0195227 | A1* | 7/2014 | Rudzicz .............. G10H 1/366 704/231 |
| 2014/0342324 | A1* | 11/2014 | Ghovanloo ............ G09B 5/06 434/185 |
| 2016/0019886 | A1 | 1/2016 | Hong et al. |
| 2016/0027441 | A1 | 1/2016 | Liu et al. |
| 2016/0299354 | A1 | 10/2016 | Shtukater |
| 2017/0358301 | A1* | 12/2017 | Raitio .................. G10L 13/033 |
| 2018/0061272 | A1* | 3/2018 | You ..................... H04R 1/1091 |
| 2018/0122361 | A1* | 5/2018 | Silveira Ocampo ..................... G10L 13/0335 |
| 2019/0189145 | A1 | 6/2019 | Rakshit et al. |

OTHER PUBLICATIONS

Sasaki et al., "Modeling of Human-body Near-field Communication and Evaluation of Communication Quality", NTT Technical Review, vol. 8, No. 3, Mar. 2010, 6 pages.

Anonymously, "Method and System for Capturing and Transmitting Voice through a Wearable Nose Ring", IP.com Prior Art Database Technical Disclosure, IPCOM000239974D, Dec. 18, 2014, 3 pages.

Yatani et al., "BodyScope: A Wearable Acoustic Sensor for Activity Recognition", UbiComp' 12, Sep. 2012, 10 pages.

Emanuel et al., "Some Characteristics of Oral and Nasal Air Flow During Plosive Consonant Production", Date pp. 249-260.

Ayala-Acevedo et al., "Quantitative Assessment of Magnetic Sensor Signal Processing Algorithms in a Wireless Tongue-Operated Assistive Technology", 34th Annual International Conference of the IEEE EMBS, San Diego, CA, Aug. 28-Sep. 1, 2012, IEEE, 2012, pp. 3692-3695.

"New Tongue Drive System Uses Dental Retainer to Operate Wheelchair", http://medicalbuy.net/2012/07/tongue-drive-system-dental . . . , Jul. 30, 2012, 7 pages.

Santos, Samsung Patents Smart Contact Lenses With a Built-in Camera, https://futurism.com/samsung-patents-smart-contact-lenses-built-camera/, Futurism, Apr. 2016, 8 pages.

Google awarded patent for smart contact lens that runs on solar power, http://www.yourictmagazine.com/technology/577-google-awarded-patent-for-smart-contact-lens-that-runs-on-solar-power.html, ICT Magazine, retrieved from internet Dec. 2017, 4 pages.

Stoye, Glucose-sensing contact lens could run on power of tears, https://www.chemistryworld.com/news/glucose-sensing-contact-lens-could-run-on-power-of-tears/6309.article, Chemistry World, Jun. 26, 2013, 3 pages.

Hiiemae et al., Tongue Movements in Feeding and Speech, http://surface.syr.edu/cgi/viewcontent.cgi?article=1001&context=bce, Nov. 2003, 18 pages.

Perrier et al., Influences of tongue biomechanics on speech movements during the production of velar stop consonants: A modeling study, http://arxiv.org/ftp/physics/papers/0606/0606143.pdf, 2003, 63 pages.

Speech Science, https://en.wikipedia.org/wiki/Speech_science, Wikipedia, retrieved from internet Dec. 2017, 5 pages.

3D Electromagnetic Aritculograph, 3D-recording of speech-movement inside the mouth, Carstens Medizinelektronik GmbH, http://www.articulograph.de/?page_id=179, retrieved from internet Dec. 2017, 4 pages.

Speech Sound Structures, http://www.speechlanguage-resources.com/speech-sound-structures.html, retrieved from internet Dec. 2017, 4 pages.

Speech Sensor Redesign, https://www.google.co.in/url?sa=t&rct=j&q=&esrc=s&source=web&cd=6&cad=rja&uact=8&ved=0ahUKEwjW7dnjt87KAhWm46YKHevHCBkQFggyMAU&url=http%3A%2F%2Fcapstone.byu.edu%2Fsites%2Fdefault%2Ffiles%2Fabstracts%2Fpdfs%2FComplete%2520Speech%2520%252311.pdf&usg=AFQjCNFYj6jYN8eRSsyaii-2weLUrgNkQA, 2014, 2 pages.

Prof Stephen Hawking's voice slows down as his face muscles weaken, http://www.telegraph.co.uk/news/science/stephen-hawking/8994788/Prof-Stephen-Hawkings-voice-slows-down-as-his-face-muscles-weaken.html, retrieved from internet Dec. 2017, 2 pages.

Rothenberg, Measurement of Airflow in Speech, http://www.rothenberg.org/Airflow/Airflow.htm, Journal of Speech and Hearing Research, vol. 20, No. 1, Mar. 1977, pp. 155-176.

Krishnamurthy et al., Tongue Drive: A Tongue Operated Magnetic Sensor Based Wireless Assistive Technology for People with Severe Disabilities, http://www.ece.ncsu.edu/erl/html2/papers/ghovanloo/2006/ghovanloo_2006_krishnamurthy.pdf, ISCAS, IEEE, 2006, pp. 5551-5554.

Kim et al., Dysarthric Speech Recognition Using Dysarthria-Severity-Dependent and Speaker-Adaptive Models, Interspeech 2013, Aug. 25-29, 2013, Lyon, France, pp. 3622-3626.

List of IBM Patents or Patent Applications Treated as Related, filed Aug. 15, 2019.

* cited by examiner

PRODUCTION OF SPEECH BASED ON WHISPERED SPEECH AND SILENT SPEECH

BACKGROUND

1. Technical Field

Present invention embodiments relate to a method, a system and a computer program product for a person to communicate over a voice communication connection. In particular, present invention embodiments relate to enabling a person to communicate via a voice communication when the person has a speech disability, the person is in an environment in which the person must speak very quietly, or the person is in a very noisy environment.

2. Discussion of the Related Art

Currently, a person with a speech disability would have difficulty communicating over a voice communication medium including, but not limited to a telephone call. Similarly, a person in a quiet environment such as, for example, a library or other environment in which one is discouraged from making noise, may attempt to communicate via a voice communication medium by whispering or speaking very quietly. However, such communication may be barely audible, or not audible at all, at a remote end of the voice communication medium. Further, a person speaking via a voice communication medium while in a noisy environment may have his or her voice become inaudible at the remote end of the voice communication medium due to the noisy environment.

A number of sensors have been used for making and reporting a number of measurements related to speech. For example, sensors have been installed on a person's tongue, on a palate, embedded on one or more teeth, and mounted on a frame such as braces installed around teeth. The sensors may make measurements while a person speaks and the measurements may be used to help those with speech disabilities learn to improve their speech. The sensors may measure acoustic speech information, a position and shape of a tongue, airflow, and an amount of airflow. A tongue operated magnetic sensor has been used by people with severe disabilities to control wireless assistive technology.

SUMMARY

According to embodiments of the present invention, a method, a system and a computer program product may be provided for interpreting low amplitude speech and transmitting amplified speech to a remote communication device. At least one computing device receives sensor data from multiple sensors. The received sensor data is associated with the low amplitude speech. At least one of the at least one computing device analyzes the received sensor data to map the sensor data to at least one syllable resulting in a string of one or more words. An electronic representation of the string of the one or more words may be generated and transmitted to a remote communication device, which produces the amplified speech from the electronic representation.

BRIEF DESCRIPTION OF THE DRAWINGS

Generally, like reference numerals in the various figures are utilized to designate like components.

DETAILED DESCRIPTION

Figure 1:
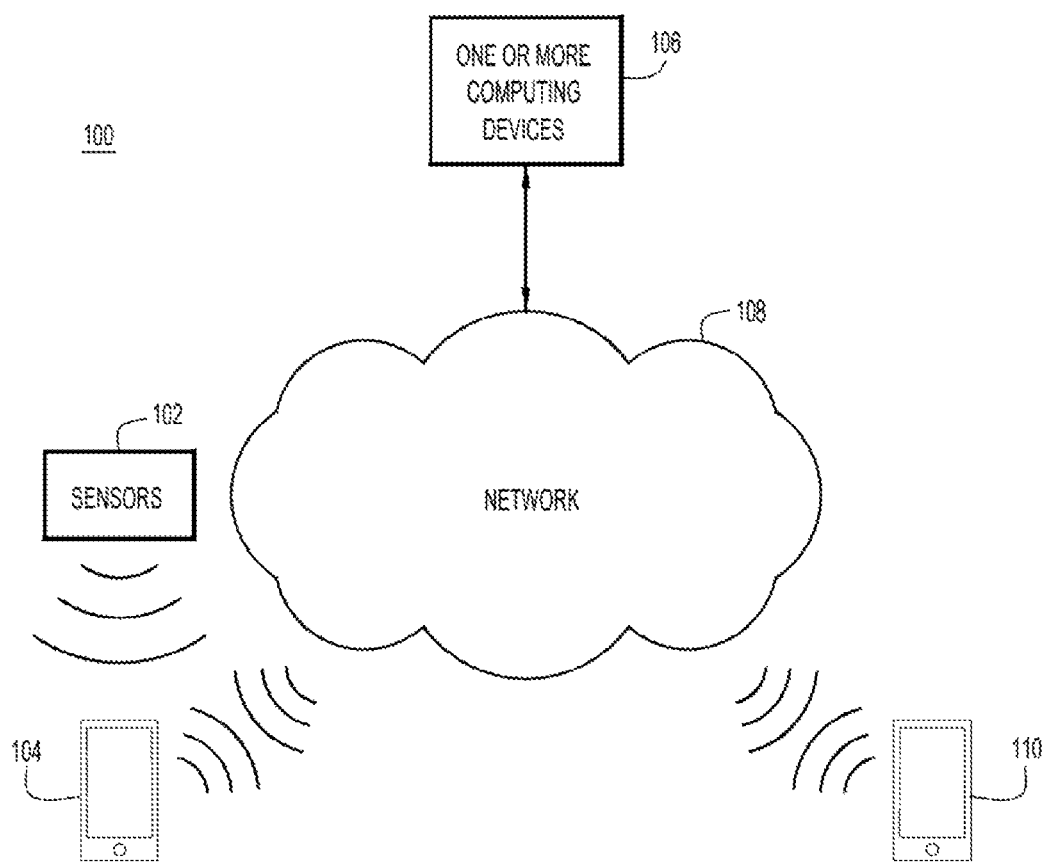
FIG. 1 shows an example environment in which embodiments of the invention may operate.

A number of sensors may be installed in a mouth of a person to take measurements related to speech. Some of the sensors may be mounted on a tongue, a palate, on teeth, and mounted on a frame, resembling braces or including braces, and surrounding teeth. Further, a video image capturing device may be located external to the mouth, but within a given distance in order to capture video images including lip movement of the person. An airflow sensor may be positioned outside of the mouth, within the given distance in order to detect a direction of airflow and an amount of the airflow. The given distance may be a distance in which a video image capturing device may clearly capture video images of moving lips and a distance in which an airflow sensor may accurately detect and measure airflow from the mouth during low amplitude speech.

The video image capturing device, the various sensors within the mouth, and the airflow sensor may make measurements while a person is whispering or silently speaking. In this specification, silently speaking, or silent speech, is defined as moving one's tongue, jaw, and lips as if one was speaking, but without whispering and using one's vocal cords. The term "low amplitude speech" includes whispered speech and silent speech, which is in a range of 0 decibels to 20 decibels. The measurements may be included in sensor data from the sensors and video image data, which may be provided to a computing device. The sensors within the mouth may send their respective sensor data through one or more wireless connections to the computing device. The airflow sensor and the video image capturing device may provide their respective sensor data or video image data either through a wired connection to the computing device or through a wireless connection to the computing device. The wireless connection may include, but not be limited to, wireless fidelity (Wi-Fi), Bluetooth® (Bluetooth is a registered trademark of Bluetooth Sig, Inc. Corp., incorporated in Delaware), or other wireless technology. In some embodiments, the video image capturing device may be included as a component of the computing device.

In some embodiments, the computing device may include any one of a smartphone, a tablet computing device, a laptop or notebook computing device, or other type of computing device with or without the video image capturing device included therein. In other embodiments, the video image capturing device may be a standalone device capable of sending video image data to the computing device via either a wired connection or a wireless connection.

The computing device may process the received sensor data, may provide the received sensor data for processing to one or more other computing devices, or may share processing of the sensor data with the one or more other computing devices. The processing may include analyzing the received sensor data to map sensor data to one or more spoken syllables, resulting in a string of one or more words. An electronic representation of the string of one or more words may be generated and transmitted to a remote communication device for producing the amplified speech from the electronic representation. The amplified speech may be in a range of 65 decibels to 75 decibels. Voice information may be received from the remote communication device and a voice may be played on the computing device, thereby reproducing a spoken string of one or more words based on the received voice information.

An example environment 100 for use with present invention embodiments is illustrated in FIG. 1. Specifically, the environment may include a variety of sensors 102, a computing device 104 located in a vicinity of sensors 102, one or more computing devices 106 connected to computing device 104 via a network 108, and a communication device 110 connected to network 108. Network 108 may be implemented by any number of any suitable communications media (e.g., wide area network (WAN), local area network (LAN), Internet, Intranet, public switched data network (PSDN), public switched telephone network (PSTN), etc.). Alternatively, computing device 104, one or more computing devices 106, and communication device 110 may be local to each other, and may communicate via any appropriate local communication medium (e.g., local area network (LAN), hardwire, wireless link, Intranet, etc.).

Figure 2:
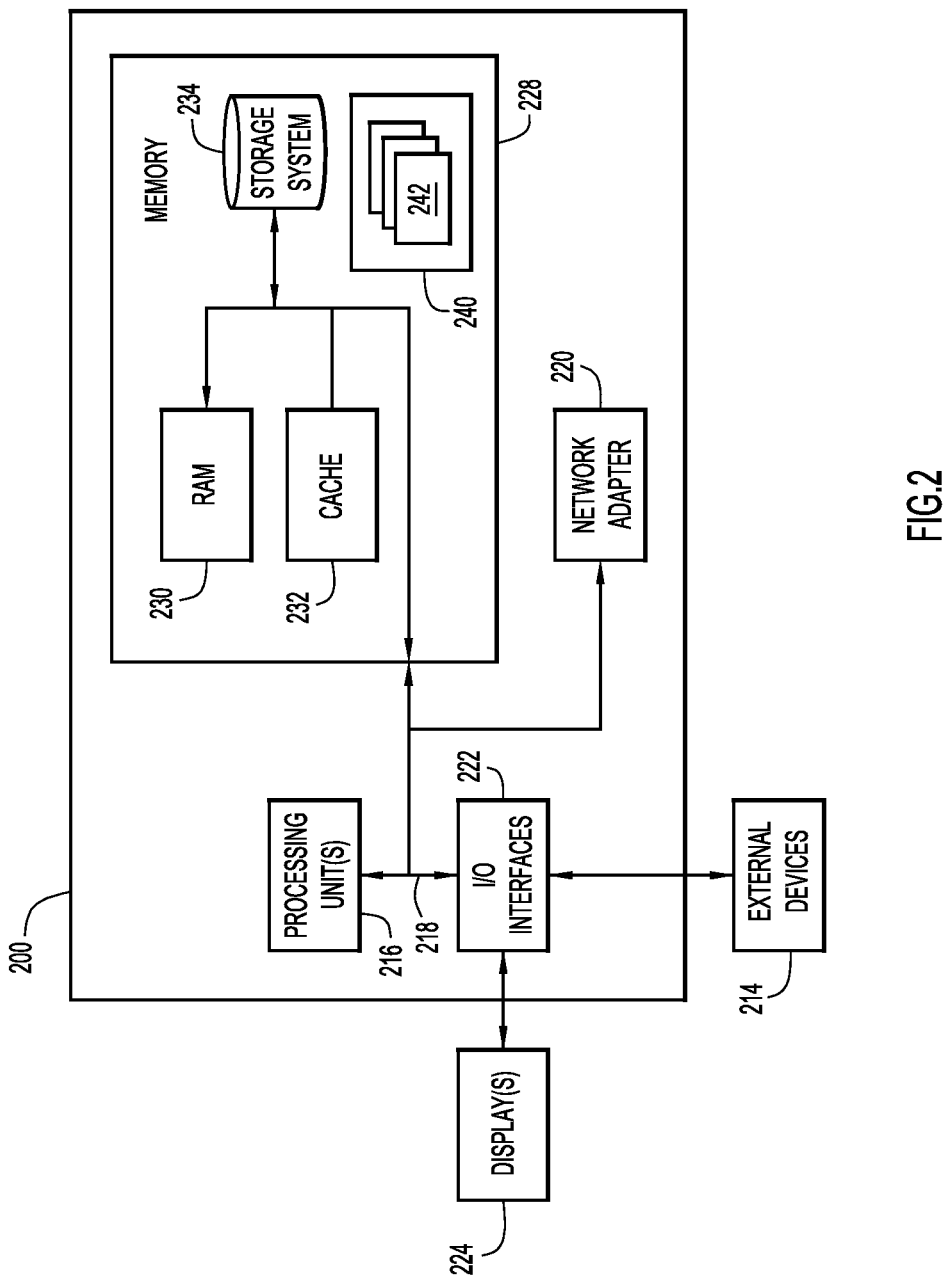
FIG. 2 is a functional block diagram of a computing system that may be used to implement embodiments of the invention.

FIG. 2 is a functional block diagram of a computing system 200 that may implement one or more computing devices 106, computing device 104 and communication device 110 in various embodiments of the invention. Computing system 200 is shown in a form of a general-purpose computing device. Components of computing system 200 may include, but are not limited to, one or more processors or processing units 216, a system memory 228, and a bus 218 that couples various system components including system memory 228 to one or more processing units 226.

Bus 218 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computing system 200 typically includes a variety of computer system readable media. Such media may be any available media that is accessible by computing system 200, and may include both volatile and non-volatile media, removable and non-removable media.

System memory 228 can include computer system readable media in the form of volatile memory, such as random access memory (RAM) 230 and/or cache memory 232. Computing system 200 may further include other removable/non-removable, volatile/non-volatile computer system storage media. By way of example only, storage system 234 can be provided for reading from and writing to a non-removable, non-volatile magnetic medium (not shown, which may include a "hard drive" or a Secure Digital (SD) card). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 218 by one or more data media interfaces. As will be further depicted and described below, memory 228 may include at least one program product having a set (e.g., at least one) of program modules that are configured to carry out the functions of embodiments of the invention.

Program/utility 240, having a set (at least one) of program modules 242, may be stored in memory 228 by way of example, and not limitation, as well as an operating system, one or more application programs, other program modules, and program data. Each of the operating system, the one or more application programs, the other program modules, and the program data or some combination thereof, may include an implementation of a networking environment. Program modules 242 generally carry out the functions and/or methodologies of embodiments of the invention as described herein.

Computing system 200 may also communicate with one or more external devices 214 such as a keyboard, a pointing device, one or more displays 224, one or more devices that enable a user to interact with computing system 200, and/or any devices (e.g., network card, modem, etc.) that enable computing system 200 to communicate with one or more other computing devices. Such communication can occur via Input/Output (I/O) interfaces 222. Still yet, computing system 200 can communicate with one or more networks such as a local area network (LAN), a general wide area network (WAN), and/or a public network (e.g., the Internet) via network adapter 220. As depicted, network adapter 220 communicates with the other components of computing system 200 via bus 218. When implementing computing device 104, computing system 200 may further include a wireless transceiver, as shown on FIG. 3, for communicating with sensors 102. The wireless transceiver may communicate via Wi-Fi, Bluetooth®, or other wireless communication technology. It should be understood that, although not shown, other hardware and/or software components could be used in conjunction with computing system 200. Examples, include, but are not limited to: microcode, device drivers, redundant processing units, external disk drive arrays, RAID systems, tape drives, and data archival storage systems, etc.

Figure 3:
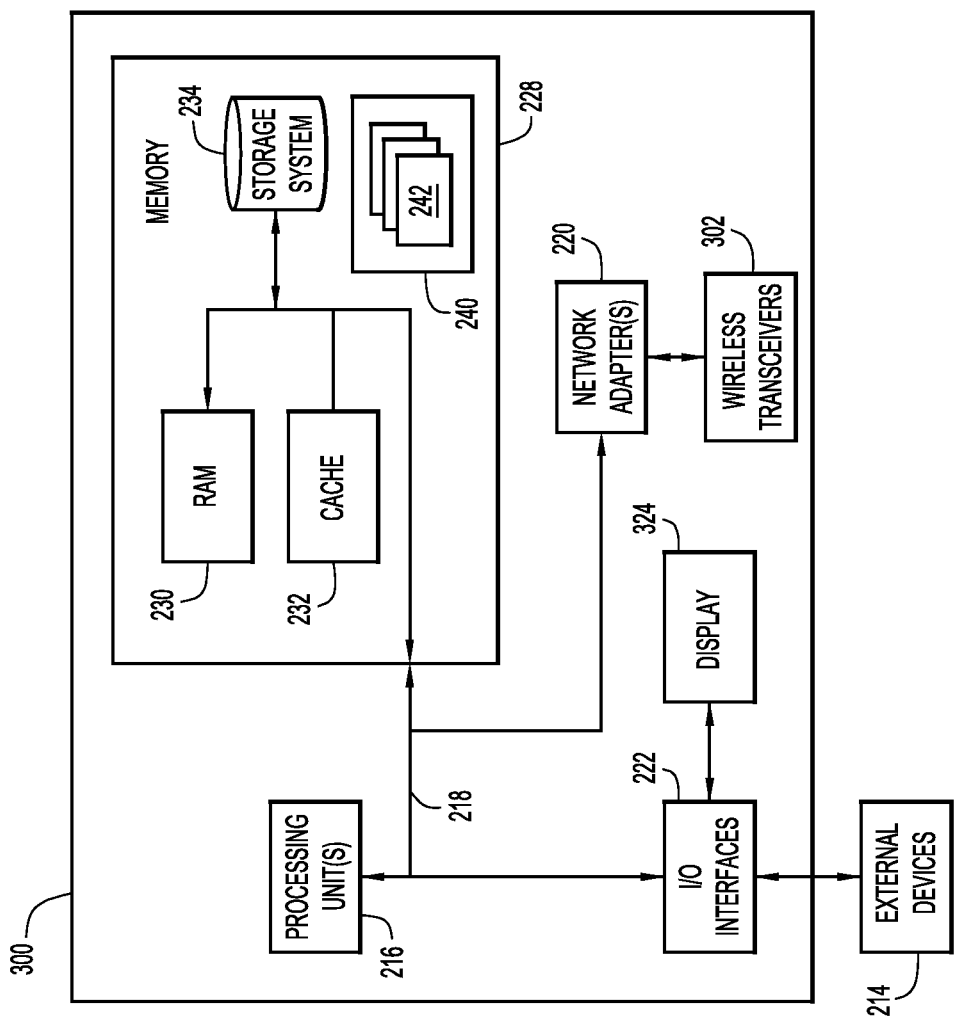
FIG. 3 is a functional block diagram of a computing device that may wirelessly receive sensor data during low amplitude speech according to embodiments of the invention.

FIG. 3 illustrates a functional block diagram of a computing system 300 that may implement computing device 104 and/or communication device 110. In some embodiments, computing system 300 may implement a smartphone. Components having reference numerals identical to those of FIG. 2 are equivalent components. Display 324 may be included as part of computing system 300. Computing system 300 may further include one or more wireless transceivers 302 including, but not limited to, a Wi-Fi transceiver, a Bluetooth® transceiver, and a cell phone data network transceiver. Computing system 300 may further include a video image capturing device (not shown).

Figure 4:
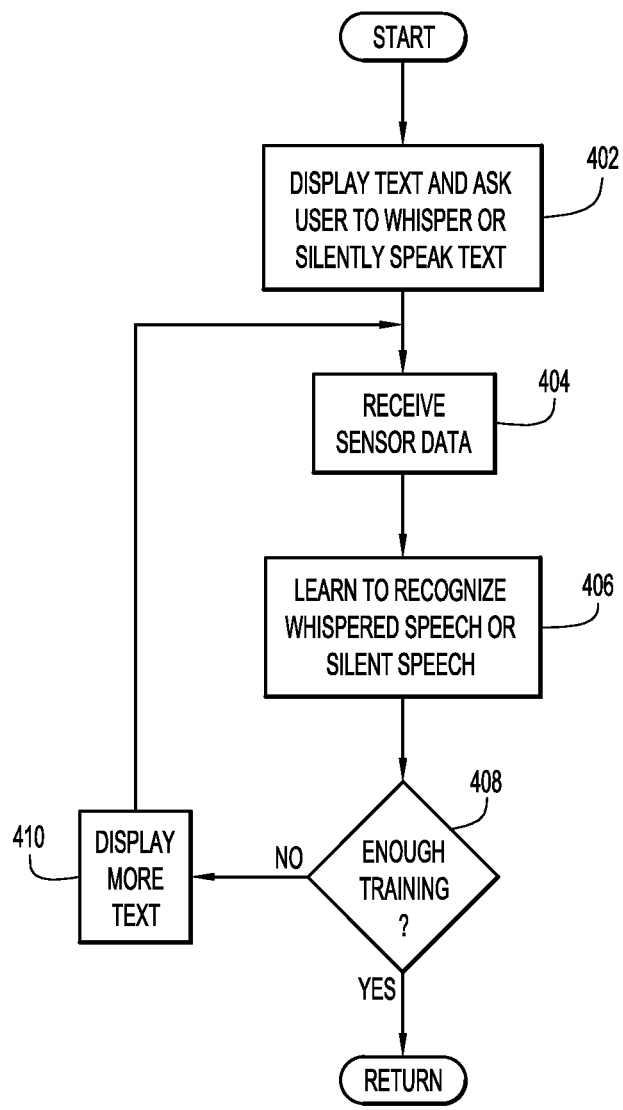
FIG. 4 is a flowchart of an example process for training a computing device to map received sensor data to one or more syllables to produce a string of one or more words according to embodiments of the invention.

FIG. 4 is a flowchart illustrating an example process according to embodiments of the invention for training the embodiments to map sensor data and video image data to one or more syllables to produce a string of one or more words. The processing assumes that a person has at least some sensors 102, as previously described, installed in a mouth. Others of sensors 102 may include, but be not limited to, a video image capturing device focused on lips of the person and an airflow sensor located within a given distance of the mouth for detecting and measuring airflow.

The process may begin with computing device 104 displaying text, on a display screen, prompting the person to whisper or silently speak the displayed text (act 402). While the person is whispering or silently speaking the displayed text, computing device 104 wirelessly receives the sensor data (act 404) from sensors 102 and video image data and learns to recognize the whispered speech or the silent speech such that after training, computing device 104 may be capable of mapping the sensor data to one or more syllables to produce a string of one or more words (act 406). Various learning models may be employed including, but not limited to, neural networks, mathematical/statistical models, and classifiers. Computing device 104 may then determine whether enough training has been performed (act 408). Computing device 104 may determine whether enough training has been performed, in some embodiments, by attempting to recognize at least some of the whispered speech or silent speech and determining whether the attempted recognition is accurate. Once a predetermined level of accuracy is achieved, computing device 104 may determine that enough training has been performed.

If, during act 408, computing device 104 determines that enough training has been performed, then the training process may be completed. Otherwise, computing device 104 may display additional text for the person to whisper or silently speak and acts 404-408 may be repeated.

In other embodiments, computing device 104 may provide received sensor data to one or more computing devices 106 via network 108 for one or more computing devices 106 to recognize the whispered speech or the silent speech by mapping the received sensor data, which may include video image data, to one or more syllables to produce a string of one or more words. One or more computing devices 106 may determine whether enough training has been performed and, if not enough training has been performed, then one or more computing devices 106 may inform computing device 104 to display more text for training.

In yet other embodiments, processing for the learning may be shared among computing device 104 and one or more computing devices 106.

Figure 5:
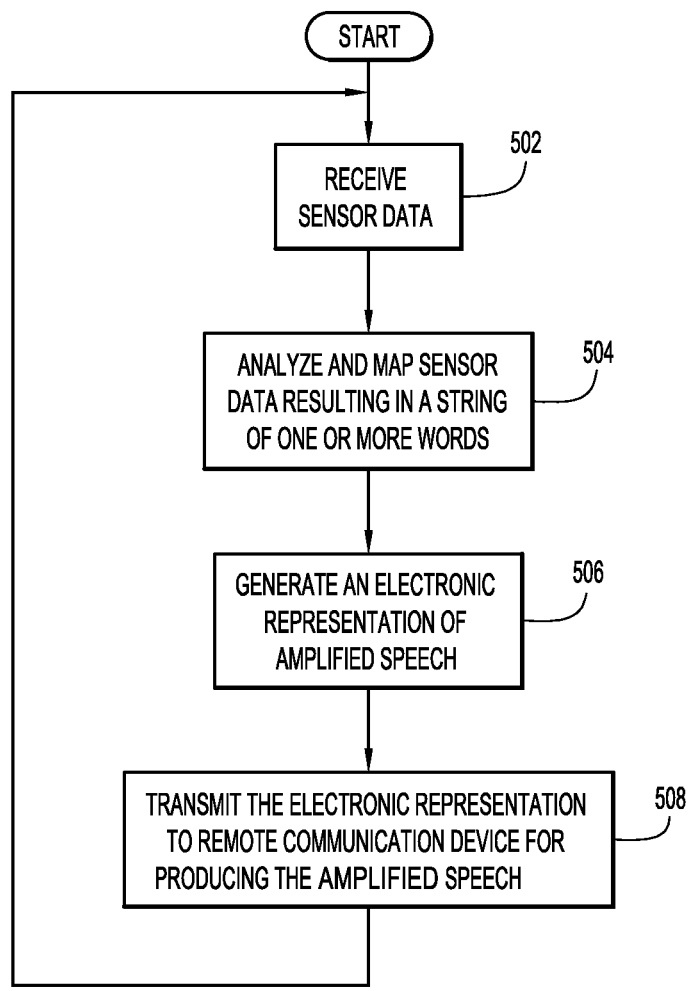
FIG. 5 is a flowchart that illustrates an example process for a computing device to map received sensor data to one or more syllables to produce a string of one or more words during operation according to embodiments of the invention.

FIG. 5 is a flowchart of a process that may be performed during an operational mode by computing device 104, either completely or in cooperation with one or more computing devices 106 via network 108. The process may begin with computing device 104 wirelessly receiving sensor data from sensors 102, including video data, while the person is whispering or silently speak (act 502). Computing device 104 may perform remaining steps of the process, may provide the sensor data to one or more computing devices 106 via network 108 for one or more computing devices to perform remaining steps of the process, or the remaining steps of the process may be performed by a combination of computing device 104 and one or more computing devices 106.

The received sensor data from sensors 102 may be analyzed to map the one or more syllables to produce a string of one or more words (act 504). An electronic representation of amplified speech, including the string of one or more words, may then be generated (act 506) and transmitted to remote communication device 110, which produces the amplified speech in a form of a voice speaking the one or more words (act 508). The amplified speech may be in a range of 65 decibels to 75 decibels. Remote communication device 110 may include a smartphone, a laptop or notebook computing device, a desktop computing device, or a telephone. The electronic representation of the amplified speech may include amplified speech produced from a voice recording including spoken syllables or from a computer-generated voice. The voice recording may include a voice of the person or a voice of another person. In some embodiments, the person may select a voice from a number of recorded human voices or a number of computer-generated voices for use in these embodiments.

Figure 6:
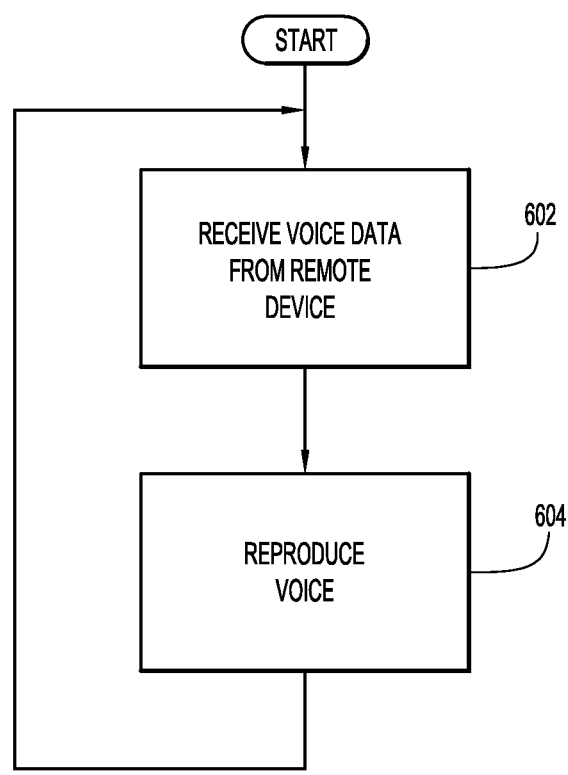
FIG. 6 illustrates an example process for a computing device to receive voice data from a remote communication device and reproduce the voice data.

The process illustrated by FIG. 5 may transmit and receive electronic representations of amplified speech during a voice call with a person using remote communication device 110. FIG. 6 is a flowchart that illustrates a second process that may be performed by computing device 104 in various embodiments. The process may begin with receiving voice data such as, for example, an electronic representation of a voice speaking one or more words, from communication device 110 (act 602). Computing device 104 may then play, or reproduce the voice (act 604). Voice communications between computing device 104 and communication device 110 may continue until the voice call between computing device 104 and communication device 110 ends.

Figure 7:
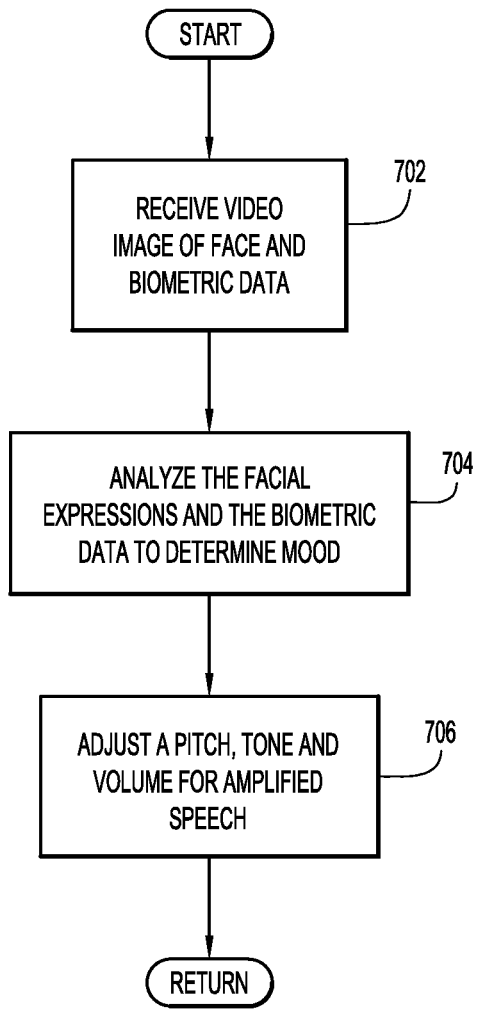
FIG. 7 is a flowchart that illustrates an example process, according to embodiments of the invention, for determining a mood of a person who produced low amplitude speech and adjusting a pitch, a tone and a volume of generated amplified speech based on the determined mood.

FIG. 7 is a flowchart of an additional process that may be performed in some embodiments for determining a mood of the person and adjusting a pitch, tone and volume for spoken amplified speech. In this embodiment, video image data of a face of the person and biometric data of the person may be provided to computing device 104. The biometric data may include, but not be limited to, heart rate data that may be wirelessly transmitted to computing device 104 from a heart rate monitor. The process may begin with computing device 104 receiving video image data of a face of the person and the biometric data as well as the sensor data from sensors 102, as previously discussed (act 702). In addition to analyzing, sensor data as previously described with respect to act 504, computing device 104 or one or more computing devices 106, or a combination of computing device 104 and one or more computing devices 106, may analyze facial expressions in the video image data and the biometric data to determine a mood of the person (act 704). Computing device 104 may then adjust a pitch, a tone and a volume with respect to the amplified speech based on the determined mood (act 706). For example, if the facial expression is determined to be an angry expression and the biometric data also is indicative of anger, then the pitch, the tone and the volume for the amplified speech may be adjusted such that the amplified speech may sound louder.

Figure 8:
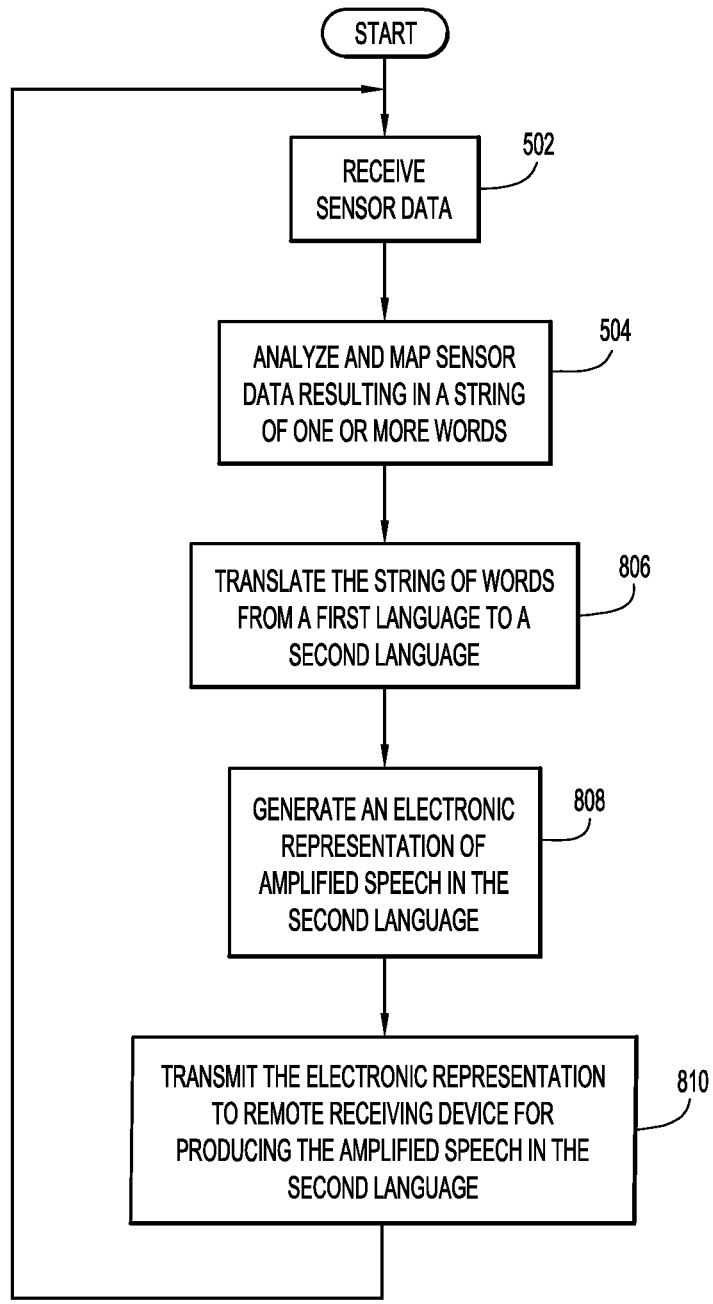
FIG. 8 is a flowchart that explains an example process, according to embodiments of the invention, for a computing device to receive sensor data that is mapped to a string of one or more words in a first language, translate the string of one or more words in a first language to a string of one or more words in a second language, and transmit an electronic representation of the string of one or more words in the second language to a remote communication device to be produced as amplified speech in the second language.

According to some embodiments, the received sensor data may be mapped to a string of one or more words in a different language. FIG. 8 is a flowchart illustrating a process that may be performed in these embodiments. The process may start with computing device 104 receiving sensor data from sensors 102 (act 502). Computing device 104 may further receive video image data from an video image capturing device, which may be a separate device or may be included in computing device 104. In some embodiments, at least some of the received sensor data and the video imaging data may be transmitted to one or more other computing devices 106, via network 108, for processing. In other embodiments, computing device 104 may perform the processing or a combination of computing device 104 and one or more computing devices 106 may perform the processing.

During the processing, the received sensor data and the video image data may be analyzed to map this data to one or more syllables to produce a string of one or more words (act 504). The string of one or more words may then be translated from a first language to a second language (act 806) and an electronic representation of amplified speech, including the string of one or more words in the second language, may be generated (act 808). The electronic representation of the amplified speech in the second language may then be transmitted to remote communication device 110 via network 108 (act 810) where remote communication device 110 may produce the amplified speech in the second language.

Figure 9:
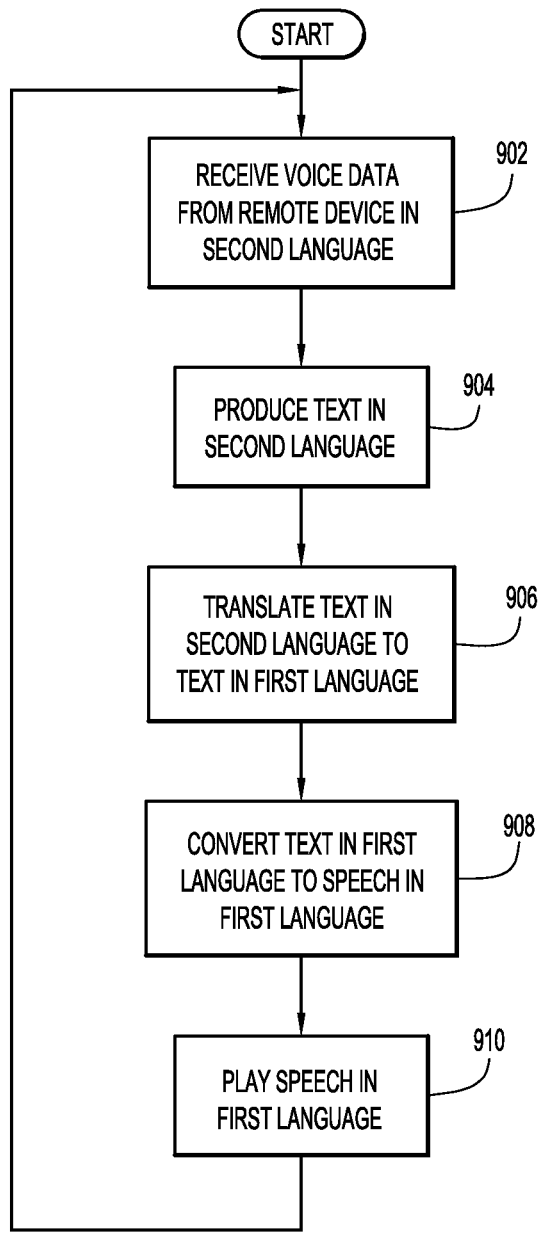
FIG. 9 is a flowchart of an example process, according to embodiments of the invention, for receiving voice data including one or more words in a second language from a remote communication device, translating the string of one or more words in the second language to a string of one or more words in a first language, and playing speech including the one or more words in the first language.

Further, computing device 104 may receive voice data from remote communication device 110 in the second language and may translate the voice data from the second language to the first language before playing the voice data. FIG. 9 is a flowchart of an example process that may be performed in such embodiments.

The process may begin with computing device 104 receiving voice data in the second language from remote communication device 110 (act 902). Computing device 104 may produce text in the second language from the received voice data from remote communication device 110 (act 904). Computing device 104 may then translate the text in the second language to text in the first language (act 906), which may be converted to speech in the first language (act 908), which may then be played to the person using computing device 104 (act 910).

In an alternative embodiment, after computing device 104 receives the voice data from remote communication device 110, the voice data may be transmitted from computing device 104 to one or more computing devices 106, via network 108, which may then perform acts 904-908 and may transmit an electronic representation of the speech in the first language to computing device 104, which may play the speech in the first language to the person using computing device 104 (act 910).

In at least some of the embodiments, a voice communication connection may be established between a first computing device 104 and a second computing device 104. As previously described, first computing device 104 may receive sensor data from a first group of sensors 102, including sensors in a mouth of a first person and an airflow sensor for monitoring airflow from the mouth of the first person. Further, second computing device 104 may receive sensor data from a second group of sensors 102 including sensors in a mouth of a second person and an airflow sensor for monitoring airflow from the mouth of the second person. First computing device 104 and second computing device 104 may process corresponding received sensor data and respective video image data of lip movement of the first person and lip movement of the second person to analyze the corresponding received sensor data and video image data in order to map this received data to one or more syllables to produce respective strings of one or more words, as previously described. Each of the first computing device 104 and second computing device 104 may transmit an electronic representation of speech including the corresponding string of one or more words to a corresponding remote computing device 104 for playing the respective speech including the corresponding string of one or more words.

Further, two computing devices 104 in embodiments in which translation occurs may have a voice connection therebetween in which each of the two computing devices 104 maps respective received sensor data and respective video images of lip movement to syllables to produce a respective string of one or more words of speech in one language, which is played as speech in a second language at a corresponding one of the two computing devices 104 at a remote end of the voice connection. Translation of the string of one or more words mapped from received sensor data may occur at computing device 104 that receives the sensor data and analyzes the sensor data and the video image data. In these embodiments, received speech from remote computing device 104 may have already been translated and may not require additional translation at communication device 104 that receives the speech in electronic form. Alternatively, one or more computing devices 106 may perform translation in cooperation with communication device 104 at a voice sending side of the connection.

Alternatively, when two computing devices 104 have a voice connection therebetween, instead of performing translation of the one or more words at each of computing device 104 based on the received sensor data, translation may be performed at computing device 104 based on speech received from a remote end of the voice connection.

Figure 10:
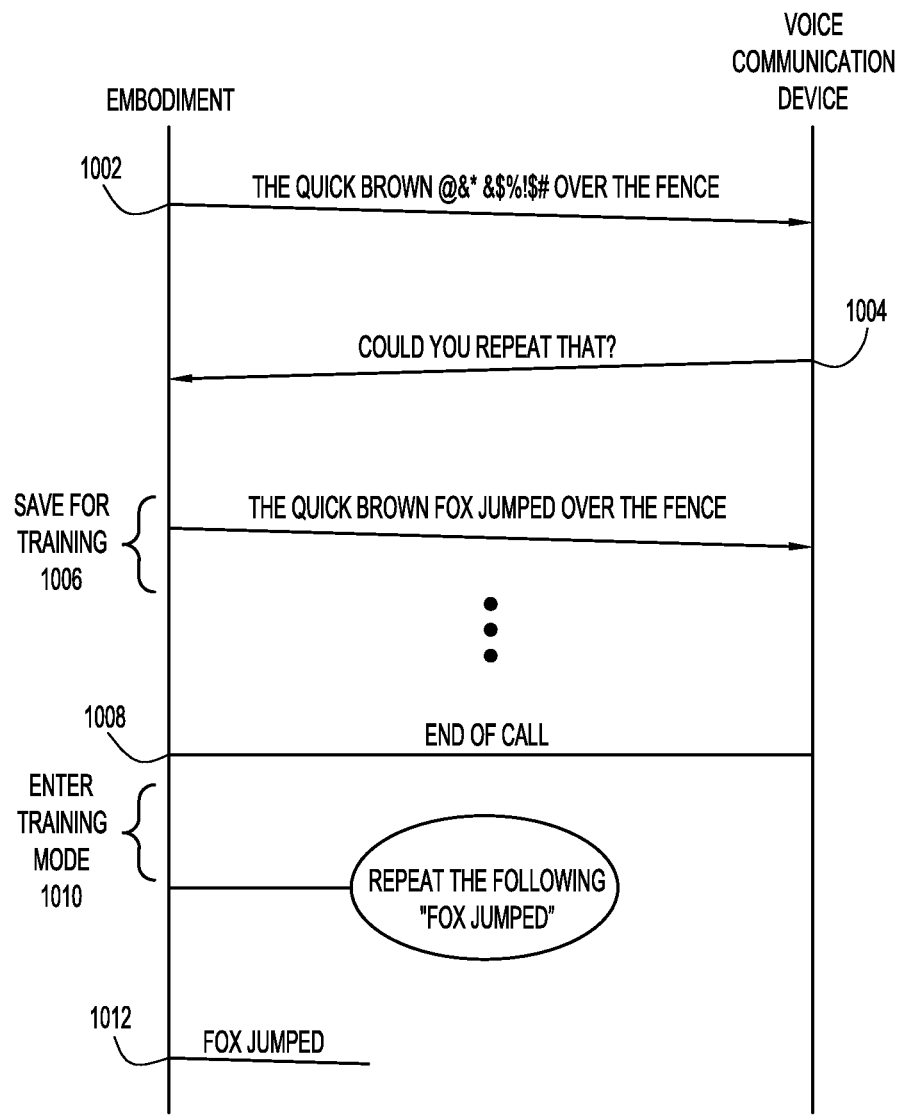
FIG. 10 illustrates example communications between a computing device, which maps received sensor data to one or more words of amplified speech, and a remote communication device such that the computing device may improve the mapping based on received feedback from the communication device.

According to some embodiments, as computing device 104 is being used to receive the sensor data and analyze the sensor data and the video image data to map the received sensor data and the video image data to one or more syllables to produce amplified speech, the mapping of the sensor data and the video image data to one or more syllables to produce a string of one or more words may be improved upon based on feedback from a user at communication device 110. FIG. 10 illustrates an example of the feedback from the communication device 110 being used to improve the mapping. At 1002, a person using communication device 104 may speak silent speech or whispered speech. Computing device 104 may receive the sensor data and the video image data produced during the whispered speech or the silent speech, the sensor data and the video image data may then be mapped to one or more syllables to produce one or more words of amplified speech. However, at least some of the received sensor data and the video image data may not be mapped correctly to one or more syllables to produce the string of one or more words. As a result, the one or more words that should have been produced may be transmitted as "The quick brown fox <mumble mumble>over the fence." The user at communication device 110 hears partially garbled produced speech and may respond by saying, "Could you repeat that?" (or another phrase with a similar meaning) 1004, which may be received by computing device 104. Natural language processing, which may be performed by computing device 104, either alone or in cooperation with one or more other computing devices 106, may recognize that the received speech indicates that at least some of the speech produced and sent to communication device 110 was not correctly mapped to the string of one or more words. As a result, when corresponding sensor data and video image data is received again, the correct mapping may occur resulting in a new string of one or more words, "The quick brown fox jumped over the fence." Computing device 104, working either alone or in cooperation with one or more computing devices 106 may recognize that the garbled portion of the one or more partially garbled words from the original mapping corresponds to "fox jumped". This string of words may be saved for training 1006 at a later time such as, for example, sometime after an end of the voice connection, or call, 1008. At that time, computing device 104 may enter training mode and may prompt the person using computing device 104, via spoken speech or displayed text, to whisper or silently speak either the complete string of the one or more words, "The quick brown fox jumped over the fence" or just one or more words corresponding to an original garbled portion of the string, "fox jumped" 1010. The user may then repeat the whispering or the silent speech of "fox jumped" 1012 or the "The quick brown fox jumper over the fence" and mapping adjustments may be made to improve the mapping.

It will be appreciated that the embodiments described above and illustrated in the drawings represent only a few of the many ways of implementing various embodiments.

The environment of the present invention embodiments may include any number of computer or other processing systems and databases or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., desktop, laptop, PDA, mobile devices, etc.), and may include any commercially available operating system and any combination of commercially available and custom software (e.g., browser software, communications software, server software). These systems may include any types of monitors and input devices (e.g., keyboard, mouse, voice recognition, etc.) to enter and/or view information.

It is to be understood that the software of the present invention embodiments may be implemented in any desired computer language and could be developed by one of ordinary skill in the computer arts based on the functional descriptions contained in the specification and flowcharts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various computing systems, and/or any other intermediary processing devices. The software and/or algorithms described above and illustrated in the flowcharts may be modified in any manner that accomplishes the functions described herein. In addition, the functions in the flowcharts or description may be performed in any order that accomplishes a desired operation.

The software of the present invention embodiments may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information. The database system may be implemented by any number of any conventional or other databases, data stores or storage structures to store information. The database system may be included within or coupled to server and/or client systems. The database systems and/or storage structures may be remote from or local to a computer or other processing systems, and may store any desired data.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figs. illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figs. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A method for interpreting low amplitude speech and transmitting amplified speech to a remote communication device, the method comprising:
   receiving, by at least one computing device, sensor data from a plurality of sensors, the sensor data being associated with the low amplitude speech and including biometric data of a person producing the low amplitude speech;
   receiving, by at least one of the at least one computing device, video image data of a face of the person while the person produces the low amplitude speech;
   analyzing, by the at least one of the at least one computing device, the sensor data to map the sensor data to at least one spoken syllable resulting in a string of one or more words, the analyzing further comprising analyzing video image data of lips during the low amplitude speech;
   analyzing, by the at least one of the at least one computing device, one or more facial expressions of the face, included in the video image data, and the biometric data to determine a mood of the person;
   adjusting a pitch, a tone and a volume for the amplified speech based on the determined mood:
   generating an electronic representation of the string of the one or more words;
   transmitting the electronic representation of the string of the one or more words to a remote communication device for producing the amplified speech with the adjusted pitch, the adjusted tone and the adjusted volume from the electronic representation;
   receiving an electronic representation of spoken speech from a remote device, the received spoken speech being in a second language different from a first language of the low amplitude speech;
   translating the received spoken speech to the first language from the second language; and
   producing a voice speaking the translated spoken speech in the first language.

2. The method of claim 1, wherein:
   the sensor data includes the video image data, a representation of tongue touch points, a direction of airflow from a mouth, a volume of the airflow, and a tongue shape as detected during the low amplitude speech.

3. The method of claim 1, wherein the electronic representation of the string of the one or more words is generated from a previously recorded voice speaking the at least one spoken syllable as the string of the one or more words.

4. The method of claim 1, wherein the amplified speech is computer-generated speech speaking the at least one spoken syllable as the string of the one or more words.

5. The method of claim 1, wherein the sensor data is associated with the low amplitude speech in a range from 0 decibels to 20 decibels and the amplified speech is in a range from 65 decibels to 75 decibels and is based on the low amplitude speech.

6. The method of claim 1, wherein the generating the electronic representation of the string of the one or more words further comprises:
   translating the string of one or more words from an original language to another language different from the original language to produce a string of one or more words in the another language, wherein the generated electronic representation of the string of the one or more words includes the string of the one or more words in the another language.

7. A system for interpreting low amplitude speech, the system comprising:
   a video image capturing device; and
   at least one computing device, one of the at least one computing device having a wireless connection with a plurality of sensors, each of the at least one computing device comprising:
   at least one processor; and
   a memory connected to the at least on processor, wherein the at least one processor is configured to perform:
      receiving sensor data from the plurality of sensors, the sensor data being associated with the low amplitude speech and including biometric data of a person producing the low amplitude speech;
      receiving video image data of a face of the person, from the video capturing device, while the person produces the low amplitude speech;
      analyzing the sensor data to map the sensor data to at least one syllable resulting in a string of one or more words;
      analyzing one or more facial expressions of the face, included in the video image data, and the received biometric data to determine a mood of the person;
      adjusting a pitch, a tone and a volume for amplified speech based on the determined mood;
      generating an electronic representation of the string of the one or more words;
      transmitting the electronic representation of the string of the one or more words to a remote communication device for producing the amplified speech with the adjusted pitch, the adjusted tone and the adjusted volume from the electronic representation;
      receiving an electronic representation of spoken speech from a remote device, the received spoken speech being in a second language different from a first language of the low amplitude speech;
      translating the received spoken speech to the first language from the second language; and
      producing a voice speaking the translated spoken speech in the first language.

8. The system of claim 7, wherein the at least one computing device comprises a handheld computing device.

9. The system of claim 8, wherein:
   the at least one computing device further comprises a second computing device connected with the handheld computing device via a network, wherein:
   the handheld computing device receives the sensor data from the plurality of sensors via one or more wireless connections,
   the analyzing the sensor data further comprises:
      transmitting the sensor data, including the video image data, from the handheld communication device to the second computing device via the network,
      receiving the sensor data and the video image data at the second computing device, and performing the analyzing the sensor data by the second computing device, wherein the generating the electronic representation of the string of the one or more words is performed by the second computing device.

10. The system of claim 7, wherein the sensor data comprises the video image data, a representation of tongue touch points, a direction of airflow from a mouth, a volume of the airflow, and a tongue shape during the low amplitude speech.

11. The system of claim 7, wherein the generating the electronic representation of the string of the one or more words further comprises:

translating the string of one or more words from an original language to another language different from the original language to produce a string of one or more words in the another language, wherein the generated electronic representation of the string of the one or more words includes the string of the one or more words in the another language.

12. A computer program product comprising:

at least one computer readable storage medium having computer readable program code embodied therewith for execution on at least one processor, the computer readable program code being configured to be executed by the at least one processor to perform:

receiving sensor data from a plurality of sensors, the sensor data being associated with low amplitude speech and including biometric data of a person producing the low amplitude speech;

receiving video image data of a face of the person while the person produces the low amplitude speech;

analyzing the sensor data to map the sensor data to at least one syllable resulting in a string of one or more words;

analyzing one or more facial expressions of the face, included in the video image data, and the received biometric data to determine a mood of the person;

adjusting a pitch, a tone and a volume for amplified speech based on the determined mood;

generating an electronic representation of the string of the one or more words;

transmitting the electronic representation of the string of the one or more words to a remote communication device for producing the amplified speech with the adjusted pitch, the adjusted tone and the adjusted volume from the electronic representation;

receiving an electronic representation of spoken speech from a remote device, the received spoken speech being in a second language different from a first language of the low amplitude speech;

translating the received spoken speech to the first language from the second language; and producing a voice speaking the translated spoken speech in the first language.

13. The computer program product of claim 12, wherein the low amplitude speech is from a person having a speech disability.

14. The computer program product of claim 12, wherein the sensor data includes the video image data, a representation of tongue touch points, a direction of airflow from the mouth, a volume of the airflow, and a tongue shape as detected during the low amplitude speech.

15. The computer program product of claim 12, wherein the computer readable program code is configured to be executed by the at least one processor to perform:

receiving a selection from a person indicating one of a plurality of voices, wherein the electronic representation of the string of the one or more words includes data for producing the amplified speech using the selected one of the plurality of voices.

16. The computer program product of claim 14, wherein the computer readable program code is configured to be executed by the at least one processor to perform:

improving the analyzing of the sensor data to more accurately map the sensor data to the at least one syllable based on spoken feedback received from a second person via the remote communication device.

* * * * *